United States Patent Office 2,974,178
Patented Mar. 7, 1961

2,974,178

LIQUID ENRICHMENT AND/OR SEPARATION BY ABSORPTION PROCESSES

Jesse C. H. Hwa, Levittown, Charles H. McBurney, Huntingdon Valley, and Erich F. Meitzner, Glenside, Pa., assignors to Rohm & Haas Company, Philadelphia, Pa., a corporation of Delaware No Drawing. Filed Oct. 15, 1956, Ser. No. 615,779

25 Claims. (Cl. 260—674)

This invention relates to absorption processes for the concentration, enrichment and/or separation of one or more components of a mixture of organic liquids in miscible proportions.

The process of the invention may be employed either (1) to separate one or more components in substantially pure form or condition from a mixture thereof or (2) to isolate fractions which are enriched as to one or another component, that is the fractions contain one or more components in higher concentration. The use of the term "concentration" or other forms thereof is herein intended to cover both of these procedures in a generic fashion.

It is known to use ion-exchange resins to selectively absorb certain ionically charged substances from aqueous systems, the absorption being the result of ionic forces.

In accordance with the present invention, it has been discovered that insoluble synthetic resins can be effectively employed to concentrate or separate a non-ionogenic organic compound in liquid phase from miscible mixtures thereof with other non-ionogenic liquids. The concentration or separation is based on selective or preferential imbibition or absorption by the resin of one of the liquids in the mixture apparently attributable to molecular forces of the Van der Waals' type rather than to ionic forces. By preferential absorption, it is meant that the resin absorbs a mixture of the components having a higher concentration of what may be termed the "preferentially absorbed" component than is present in the original liquid mixture applied to the resin.

The synthetic resins that have been found to exhibit the necessary selective absorption characteristics are the addition copolymers having a cross-linked structure. For example, the copolymer contains from about one-half to 10% or more of a polyethylenically unsaturated monomer, such as divinyl benzene, to provide the cross-linked structure necessary to impart insolubility in conjunction with absorptive characteristics for particular solvents.

The main component of the copolymer is derived from one or more monoethylenically unsaturated monomers by addition polymerization thereof with cross-linking molecules. These monomers are the class of monoethylenically unsaturated, polymerizable, organic compounds which contain a —CH=C< group, especially in terminal position, such as vinyl or a vinylidene group. Examples of these monomers include ethylene, isobutylene, styrene, vinyl toluene, acrylonitrile, methacrylonitrile, acrylamide, methacrylamide, vinyl esters, including vinyl chloride, vinyl acetate, vinyl propionate, vinyl butyrate, vinyl laurate, vinyl ketones including vinyl methyl ketone, vinyl ethyl ketone, vinyl isopropyl ketone, vinyl n-butyl ketone, vinyl hexyl ketone, vinyl octyl ketone, methyl ispropenyl ketone, vinyl ethers including vinyl methyl ether, vinyl ethyl ether, vinyl propyl ether, vinyl isobutyl ether, vinylidene compounds including vinylidene chloride, bromide, or bromochloride, esters of acrylic acid and of substituted acrylic acids including α-methacrylic acid, α-ethacrylic acid, α-chloroacrylic acid, α-cyanoacrylic acid with phenols and alcohols including aralkyl alcohols and alkyl-substituted phenols, such as the phenyl, benzyl, glycidyl, ethoxyethyl, cyclohexyl, methyl, ethyl, 2-chloroethyl, propyl, isopropyl, n-butyl, isobutyl, t-butyl, sec-butyl, amyl, hexyl, octyl, 2-ethylhexyl, decyl, dodecyl, hexadecyl and octadecyl esters of these acids, also the corresponding neutral or half-acid half-esters of the unsaturated dicarboxylic acids including itaconic, citraconic, aconitic, fumaric, and maleic acids, substituted acrylamides, such as N-monoalkyl,-N,N-dialkyl-, and N-dialkylaminoalkyl-acrylamides or methacrylamides where the alkyl groups may have from one to eighteen carbon atoms, such as methyl, ethyl, isopropyl, butyl, hexyl, cyclohexyl, octyl, dodecyl, hexadecyl, and octadecyl, aminoalkyl esters of acrylic or methacrylic acid, such as β-dimethylaminoethyl, β-diethylaminoethyl, or 6-dimethylaminohexyl acrylates and methacrylates, vinylpyridines, such as 2-vinylpyridine, 4-vinylpyridine, 2-methyl-5-vinylpyridine, and so on.

Besides using divinylbenzene as a cross-linking agent, there may be used any polyethylenically unsaturated copolymerizable monomer in which the double bonds are in non-conjugated relationship. Examples are: divinyltoluene, trivinylbenzene, divinylnaphthalene, ethylene glycol diacrylate or dimethacrylate, a diacrylate or dimethacrylate of propylene glycol, diethylene glycol, trimethylene glycol, hexamethylene glycol, or the like; 1,2-divinyloxyethane, 1,2,3-trivinyloxypropane, 1,4-divinyloxybutane; 1,2-bis(vinylmercapto)ethane; 1,4-bis(vinylmercapto)butane; divinylxylene, divinylethylbenzene, divinyl ether, divinyl sulfone, allyl ethers of polyhydric compounds such as of glycerol, pentaerythritol, resorcinol, etc., divinylketone, divinylsulfide, allyl acrylate, diallyl maleate, diallyl fumarate, diallyl phthalate, diallyl succinate, diallyl carbonate, diallyl malonate, diallyl oxalate, diallyl adipate, diallyl sebacate, diallyl tartrate, diallyl silicate, triallyl tricarballylate, triallyl aconitate, triallyl citrate, triallyl phosphate, N,N'-methylenediacrylamide, N,N'-ethylidenediacrylamide, 1,2-di(α-methylmethylenesulfonamido)ethylene, and so on.

The copolymers to be used as the absorbent in the processes of the invention may consist of one type of monoethylenically unsaturated unit and one type of cross-linking unit, but a copolymer absorbent may also contain two or more different monoethylenically unsaturated units and/or two or more types of cross-linking units. The copolymers may have any suitable form presenting a large surface area per unit volume or weight. For example, they may be of the granular type produced by conventional suspension polymerization procedures, or they may have the form of films, chopped films, continuous filaments, or short fibers, including those of cross-linked structure obtainable by the procedures disclosed in copending applications Serial No. 411,562, filed February 19, 1954, now U.S. Patent No. 2,869,977; Serial No. 532,789, filed September 6, 1955 and now U.S. Patent No. 2,914,376; Serial Nos. 587,925, now U.S. Patent No. 2,933,460 and 587,926, both filed May 29, 1956, the disclosures of which are incorporated herein by reference. In essence, the disclosures of those applications may briefly be described as follows:

Serial No. 411,562 deals with a process for forming filaments and like shaped products from aqueous dispersions of thermoplastic resins. It is concerned with the formation of relatively strong, self-supporting fibers and films of thermoplastic, linear, polymeric products which have apparent second order transition temperatures from about 25° to about 100° C. and which contains hydrolyzable or available reactive polar groups by starting with an aqueous dispersion of the polymeric product and shaping it with the aid of a coagulating bath, and fuse-drying the shaped product.

One of the objects of the invention covered by Serial No. 411,562 is to provide strong, cohesive, self-supporting filaments, threads, and films. Another object is to form such shaped products from aqueous dispersions of thermoplastic polymeric materials. Further purposes are to provide a process whereby such dispersions are used to form the shaped products by simple, economical steps and to form strong, self-supported filaments and films which are stable above the apparent second order transition temperatures of the polymeric substances from which they are formed. These objects are accomplished by forming an aqueous dispersion of a thermoplastic, synthetic polymeric vinylidene material, passing the dispersion through a bath or orifice or spinnerette into and through a coagulating bath to form a self-supporting shaped product, washing the product, heating the washed product whereby it is dried and polymeric particles thereof are joined together. The resulting product is stretched in the heated state.

Serial No. 523,789 is concerned with a process whereby an aqueous dispersion of a thermoplastic copolymer, which has an apparent second order transition temperature of 30° to 150° C., contains polar groups and is suspended with an acid-sensitive emulsifying agent, is passed through an orifice or opening into an acidic coagulating bath, wherein a shaped product is formed. This product is dried, fused, and usually stretched. Polymers which have proven useful for the preparation of filaments, yarns, films, and the like, by the process of this invention possess a number of properties which serve to define operative materials. These materials are copolymers from two or more polymerizable monovinylidene compounds such as those classes comprising esters, ethers, amides, nitriles, and cyclic compounds providing a $CH_2=<$ group. Copolymerization apparently is necessary in order to provide polymer chains of the mobility necessary for proper joining of particles from the dispersions with required coalescence and for successful stretching with resulting ordering of molecules.

Serial No. 587,925 deals with the production of filmy structures, within which term it is meant to include fibers, filaments, or pellicles and films having at least one dimension of one-tenth to twenty mils formed substantially entirely of cross-linked polymeric materials.

The product obtained in Serial No. 587,925 is a structure which has the small dimension indicated above and comprises a cross-linked product of a linear addition polymer, at least one-half mole percent of the units derived from the initial linear polymer molecules being attached to units derived from other initial polymer molecules to provide cross links in the product. As many as thirty to fifty mole percent of the units of the initial linear polymer molecules may be attached in cross-linked manner to the units of other initial polymer molecules; but, for most purposes, the polymers contain from one to twenty percent of cross-linking units to assure adequate insolubility and limited swelling.

In the process disclosed by Serial No. 587,925, there is obtained or produced a linear addition polymer containing within the polymer units which are adapted to be cross-linked.

The comonomers which provide the cross-linkage units in the copolymer include glycidyl acrylate and methacrylate, ureidoalkyl esters, such as ureidoethyl acrylate and methacrylate, ureidoethyl vinyl ether, ureidopentyl vinyl ether, ureidoisobutyl vinyl ether, N-vinyloxyalkyl carbamates, such as N-β-vinyloxyethyl carbamate, acrylamides, methacrylamides, N-mono-substituted acrylamides and methacrylamides, such as acrylamide per se, methacrylamide per se, N-methyl- or N-ethyl acrylamide or methacrylamide, hydroxyethyl vinyl ether or sulfide, hydroxypentyl vinyl ether or sulfide, 2-isocyanato vinyl ethers, such as 2-isocyanato-2,2-dimethylethyl vinyl ether, aminoalkyl acrylates and methacrylates, such as aminoethyl acrylate, dimethylaminoethyl acrylate and N-dimethylaminoethyl acrylamide, alkoxymethyl vinyl sulfides, such as methoxymethyl vinyl sulfide, alkoxymethyl thioalkyl acrylates, methacrylates, and itaconates, such as methoxymethylthioethyl acrylate. In general, the cross-linkable monomer is a monoethylenically unsaturated compound containing a reactive substituent, such as carboxyl, hydroxyl, amido, amino, epoxy, isocyanato, or ureido groups, and the like.

When the polymer contains epoxy groups, as in the case of copolymers of glycidyl acrylate or methacrylate, the cross-linking may be effected simply by heating the structure, such as from 60° to 250° C., the upper limit being dependent upon the other comonomers present and being insufficiently high to destroy the film or fiber structure. The time generally used is inversely proportional to the temperature. For example, a period of a few seconds to fifteen seconds may be proper in the upper regions of the temperature range given, whereas a period of time of a half an hour to several days may be desirable at lower temperatures in the range cited. This cross-linking by heat may be accelerated by simultaneous treatment with five-tenths to one percent, by weight of the polymer structure, of a catalyst, such as p-toluene-sulfonic acid, sulfuric acid, phosphoric acid, aluminum chloride, and the like.

Instead of relying upon heat with or without a catalyst or accelerator, the epoxy groups in such polymers may be reacted with polyamines containing at least two primary, secondary, or tertiary amine nitrogen atoms. It is believed that the cross-linking action obtained with the polyamines when they contain tertiary amine nitrogen groups is attributable to quaternization. The temperatures and times may fall within the ranges of temperature and time given when heat alone is employed. The diamine may be applied in a solvent, such as water, at a concentration of five percent to ten percent; but, when it is a liquid, it may be applied directly without dilution in a solvent. The filmy structure may be impregnated with the diamine by simple immersion or by spraying, or in any other suitable manner. Examples of polyamines include ethylenediamine, diethylenetriamine, triethylenetetraamine, hexamethylenediamine, N,N′ - dimethylethylenediamine, N,N,N′,N′-tetramethylethylenediamine, N,N,N′,N′ - tetraethylethylenediamine, and N,N,N′,N′-tetraethylhexamethylenediamine.

When the cross-linkable units of the polymer contain ureido or carbamato groups or linkages, cross-linking may be effected by heat alone, as in the case of the polymers of glycidyl methacrylate, the temperatures and times being generally in the same ranges as given for the glycidyl-containing polymers. They also may be cross-linked by reaction with aldehydes, especially formaldehyde, or by urea or methylol derivatives of urea, such as dimethylol urea. For this purpose, the formaldehyde may be applied as a gas or any aldehyde, including formaldehyde, or urea or derivatives of urea may be applied from solutions in water or alcohol, and the impregnated structure is heated to effect cross-linking at temperatures ranging from 30° to 250° C. for times of the same general range as outlined hereinabove in respect to the heating of polymers of glycidyl acrylates. Besides aldehydes, polyisocyanates or polyisothiocyanates, such as toluene-2,4-diisocyanate, hexamethylenediisocyanate, and the like may be used for effecting cross-linking. With them, temperatures from room temperature or lower down to about 0° C. or higher up to 250° C. may be employed, depending upon the particular polyisocyanate and the particular polymer. The times may be as above, in any case the time employed being sufficient to give the desired cross-linking.

When the cross-linkable groups in the polymer are isocyanate groups, the cross-linking may be effected by any compound having at least two reactive hydrogen atoms, including aldehydes; polyamines, such as those mentioned hereinabove for cross-linking the polymers of glycidyl acrylates; polyhydric alcohols, such as glycols, including ethylene glycol, diethylene glycol, hexamethylene glycol, glycerol, sorbitol, sorbitan, and sorbide; polythiols, especially the dithiols such as ethylene dithiol, p-xylylene dithiol; polyhydroxyphenols, such as resorcinol, pyrocatechol, orcinol, tannic acid, polycarboxylic acids; and especially dicarboxylic acids, such as succinic acid, adipic acid, sebacic acid, o-phthalic acid, terephthalic acids; and so on. Treatment may be effected by immersion or spraying in the polyfunctional reactant if it is liquid or molten at the temperature employed, or by immersion or spraying of a solution of the polyfunctional reactant. The heating may be effected while the polymeric structure is immersed in the body of reagent; but preferably excess reagent is removed and the polymer structure is heated at temperatures from about 0° C. up to 100° C. or more, such as up to 200° C. for sufficient time to effect cross-linking which may amount to a few seconds at the high temperature up to an hour or more at the lower temperature of the range.

When the cross-linkable units in the polymeric structures contain amine groups, cross-linking may be effected by polycarboxylic acids or polyisocyanates, such as any of those mentioned above; and the reaction may be effected at the temperatures mentioned hereinabove. When the cross-linkable units contain amine groups having tertiary nitrogen atoms, the cross-linking may be effected by quaternization by means of poly-halides and especially di-halides, including ethylene dichloride, xylylene dichloride, and hexamethylene dichloride. The fimly structure may be formed of homopolymers of monomeric amines, such as of diethylaminoethyl methacrylate whose units have anion-exchange characteristics and are cross-linkable by the di-halides just mentioned.

When the cross-linkable units contain hydroxyl groups, the cross-linking may be effected by means of aldehydes, such as formaldehyde, acetaldehyde, glyoxal, and the like, also aldehyde derivatives of urea, such as dimethylol urea, reaction being effected at temperatures of about 30° to 250° C. for periods of several hours at the lower temperature to a few seconds at the higher temperatures. Besides aldehydes and their derivatives, cross-linking may be effected by polyisocyanates or polyisothiocyanates, such as those mentioned hereinabove; polycarboxylic acids, such as those mentioned hereinabove; and by polybasic acid halides, such as succinoyl chloride, adipoyl chloride; and so on. These reactions may be effected within the temperature ranges mentioned hereinabove and in similar time periods.

The cross-linkable units of the polymer may consist of alkoxymethyl vinyl sulfide units, and especially methoxymethyl vinyl sulfide, which can be converted to thiol units by hydrolysis and the thiol units then converted to disulfide linkages by mild oxidation.

The cross-linkable units of the polymer may consist of alkoxymethylthioalkyl acrylate, methacrylate, or itaconate units. These units are hydrolyzed to thiol groups in the same manner as the alkoxymethyl vinyl sulfide units hereinbefore described, and mild oxidation as described above serves to form disulfide linkages.

Serial No. 587,926 relates to the production of fibers, films, and the like, from a polymer of monoethylenically unsaturated molecules comprising an alkoxymethyl vinyl sulfide or an alkoxymethyl-α-methylvinyl sulfide having the following structure:

$$CH_2=C(R)XR'OR''$$

where

R is selected from the group consisting of hydrogen and methyl,
R' is a methylene, ethylidene, or isopropylidene group, and
R'' is an alkyl group having one to eight carbon atoms, but preferably is methyl.

Since part or all of the —R'OR'' portion of the compound is eliminated in the subsequent cross-linking, it generally is preferred to polymerize the simplest compound, namely, the methoxy methyl vinyl sulfide in preparing the polymers to be used in making the fibers and films of the invention disclosed in Serial No. 587,926. Preferably, there are used copolymers containing from two-tenths to thirty percent by weight of the sulfide monomer, and preferably between five and twenty percent by weight thereof. It has been found that the polymers containing the sulfide whose formula is given above are self-cross-linking when subjected to mild oxidation at elevated temperatures. The cross-linking reaction can be effected at any stage of the fiber-forming or film-forming process either before or after stretching. It, therefore, provides a means for greatly reducing the shrinkage of, or stabilizing, an unstretched product and also for greatly reducing the shrinkage of, or stabilizing, the formed product after it has been stretched so that the maximum strength obtainable can be achieved in the stabilized product.

It should be noted that the term "particulate" wherever used in the specification and claims is intended to include all the forms of copolymers mentioned above, i.e., granular, whether of irregular or regular shape, such as spherical, films, filamentous, or fibrous forms.

Generally, the units of the copolymer derived from the monoethylenically unsaturated monomers determine the adsorptive character of the copolymer and the cross-linking units play a negligible part in this function. However, in certain cases the adsorptive capacity of a copolymer for a given organic liquid may be improved substantially by substitution of a different cross-linking agent, especially when the copolymer contains eight to ten percent or more of such units by weight.

Because of the large variety of units from which copolymer absorbents may be produced, the absorbents obtainable in accordance with the present invention are quite versatile and are capable of use in a wide variety of organic liquid systems. Of course, the selection of the copolymer to be used with any given liquid mixture depends upon the liquid to be separated and also to some extent on the other liquids in the mixture from which separation is to be made. When the liquid to be separated from the mixture is quite distinct in type from the other liquids therein, it may be relatively easy to select a copolymer on which the first liquid is preferentially absorbed on the basis of similarity of functional groups in this liquid and the copolymer units; for example, there may be involved ester groups in both cases, or ketone groups. However, this rule of thumb procedure is not applicable to all possible liquid mixtures to be separated and for this reason a simple testing procedure has been devised and found to be quite a practical aid in selecting a resin for a given liquid mixture. This test involves simply the agitation of a given amount of resin in a given amount of the liquid mixture for a given period of time and determining the extent to which selective absorption or imbibition occurs by any suitable analysis of the liquid composition before and after absorption on the resin, such as by measurement of refractive index, density, vapor pressure or chemical analysis for a given element, such as chlorine. For example, one part by weight of resin is agitated in five parts by weight of the liquid mixture for a given period, such as one hour or 16 hours and the refractive index of the unabsorbed liquid is measured for comparison with the refractive index of original mixture to determine the extent to which selective absorption occurs. The above testing procedure also enables one to determine the separatory capacity of the resin which will be dealt with later. The separatory capacity is calculated from this formula:

$$\text{Separatory capacity} = \frac{V(c_0 - c)}{m(1 - c)}$$

where:

$m$ is the weight of the resin in grams,
$V$ is the volume of the liquid added in ml., and
$c_0$ and $c$ are the volume fractions of the preferentially absorbed component in the liquid phase before and after equilibrium respectively.

The absorption procedure of the present invention is applicable to mixtures of organic compounds which are homogeneous liquid systems at ordinary temperatures or which form such systems at conditions of temperature suitable for operating the process which may range from below room temperature, such as down to about zero centigrade up to the boiling point of the mixture of the liquids or of an azeotrope thereof. Preferably, the operating temperature is in the neighborhood of normal room or outside conditions such as from about 15° to about 35° C. The process of the invention is concerned with liquid mixtures of non-ionogenic character which are homogeneous under the conditions of operation, that is the liquids in the mixture are completely miscible with each other in the proportions in which they are present in the mixture. The liquids need not be completely miscible over their entire range of possible proportions provided the mixture to be processed is a homogeneous system in which the several liquids are completely mixed with one another.

The process of the present invention is adapted to separate or recover one or more components of liquid mixtures which may be of a type presenting difficulty in separation by distillation, crystallization, extraction, or other absorption procedures. Thus, a mixture of liquids having similar boiling points cannot be fractionally distilled but can be separated by absorption on an absorbent resin in accordance with the present invention. An example of this is a toluene/iso-octane (2,2,4-trimethylpentane) mixture produced in the petroleum industry from which recovery is desired of the more valuable toluene. Similarly, more complex mixtures of aromatic hydrocarbons with paraffinic hydrocarbons can be processed to separate the aromatics from the paraffinics. The separation of other hydrocarbon mixtures, such as paraffin/naphthene, olefin/paraffin, and even individual hydrocarbons of the same character whether aromatic, paraffinic, or naphthenic including geometrical or structural isomers can also be accomplished by the present invention.

Examples of other anhydrous or non-aqueous liquid systems adapted to be processed in accordance with the present invention include solvent mixtures used in the production of inks and lacquers which may include alcohols, ketones, hydrocarbons, and esters; solvent mixtures which are by-products of chemical reactions, such as a mixture of capryl alcohol containing 15 to 20% of methyl hexyl ketone; mixtures of ethylene dichloride with iso-octane; and also various azeotropes. Examples of azeotropic mixtures from which one of the components may be separated by absorption on a cross-linked copolymer by the process of the invention include chlorobenzene/allyl alcohol, allyl alcohol/water, benzene/acrylonitrile, and chloroform/acetone. Examples of partially miscible liquid mixtures which are separable in their miscible ranges (given in volume percent concentrations) include pyrrole/iso-octane containing up to about 8% pyrrole or about 81 to 99% pyrrole; nitrobenzene/iso-octane containing up to about 22% and from about 60 to 99% of nitrobenzenes; and n-butanol/water up to 8% or from about 80 to 99% of n-butanol. In these latter systems, a 95% n-butyl acrylate/5% divinylbenzene copolymer preferentially absorbs nitrobenzene and pyrrole from the first two systems in the miscible mixtures having high concentrations of iso-octane but preferentially absorbs the iso-octane in the miscible mixtures containing low concentrations thereof. In the third system, the same resin preferentially absorbs the n-butanol in both miscible ranges. The product of the absorption process of the invention may be one or more of the liquids isolated in reasonably pure form or a liquid mixture wherein the concentration of one component has been greatly altered from the original concentration.

Separatory capacities can be determined for any given resin for any particular liquid in a liquid mixture by using the simple test method described hereinabove. Table I gives the separatory capacities thus determined for a variety of resins in mixtures of 80 volume percent of iso-octane with 20 volume percent of the various other solvents listed, allowing the resin to contact the liquid mixture at 25° C. for 16 hours. The separatory capacity determined in each case corresponds to the volume in cc. of the preferentially absorbed solvent that can be separated per 100 grams of resin under ideal conditions. The first column of the table lists the solvent absorbed preferentially on the resin. The resins contained 4 to 5% of divinylbenzene and were made in granular or bead form by suspension polymerization procedures and the monoethylenically unsaturated comonomer used is indicated at the head of each respective column, the abbreviations being as follows:

MA—methyl acrylate
n-BA—n-butyl acrylate
t-BA—t-butyl acrylate
2-EHA—2-ethylhexyl acrylate
MMA—methyl methacrylate
n-BMA—n-butyl methacrylate
STY—styrene
MIK—methyl isopropenyl ketone

TABLE I

| Solvent+[Iso-octane] | MA | n-BA | t-BA | 2-EHA | MMA | n-BMA | STY | MIK |
|---|---|---|---|---|---|---|---|---|
| 4-Vinylcyclohexene | 0 | 8.8 | | | 0 | 8 | 0 | 0 |
| Cyclohexanol | | 14 | | | | | | |
| Toluene | 7 | 17 | 12 | 11 | 0 | 14 | 13 | 0 |
| Ethyl Acetate | 15 | 18 | | | 3.4 | 16 | 16 | |
| Methyl Ethyl Ketone | 16 | 20 | | | 13 | 19 | 19 | |
| Styrene | 13 | 24 | | | 1 | 18 | 18 | 0 |
| Chlorobenzene | | 26 | | | | | 20 | |
| Ethylene Dichloride | 41 | 40 | 32 | 24 | 26 | 29 | 25 | 16 |
| Chloroform | | 40 | | | | | | |
| Dioxane | 48 | 44 | | 20 | 2.4 | 27 | 31 | 2.2 |
| Pyridine | 54 | 54 | 43 | 28 | 21 | 31 | 44 | |
| Naphthalene [a] | | 5 | | | | 5 | | |
| Nitrobenzene [b] | | 52 | | | | | 35 | |
| Pyrrole [c] | | 40 | | | | | | |

[a] Partially miscible with iso-octane; valid for a mixture having 3% by weight of naphthalene.
[b] Partially miscible with iso-octane; valid for a mixture having 10% by volume of nitrobenzene.
[c] Partially miscible with iso-octane; valid for a mixture at 2% by volume of pyrrole.

The separatory capacities of a given resin-solvent A-solvent-B system depends on the concentration of A in the A-B mixture. The higher the concentration of A, the preferentially absorbed component, the greater the capacity. The figures in Table I show the comparative effectiveness of the various resins for absorbing the several solvents.

The various resins have different rates of absorption, and for the systems of Table I the n-butyl acrylate resin was exceptionally rapid in reaching equilibrium, taking less than two minutes in the toluene-iso-octane system. Of course, the more rapid the absorption the higher the permissible rate of passage of the liquid mixture through the resin. The rate is also related to particle size, the smaller the size the greater the rate.

Table II lists a number of additional separatory capacities for various solvent mixtures and certain of the resins used in the determinations given in the first table above.

TABLE II

| Mixture, Volume Percent | | Monomer Unit in Resin | | |
|---|---|---|---|---|
| 20 | 80 | n-BA | MMA | Styrene |
| Ethylene dichloride | Toluene | 4.6 | 0 | 3.0 |
| Do | Ethyl Acetate | 5.0 | | 0 |
| Styrene | Toluene | 1.2 | 1.4 | 5.4 |
| Do | Vinylcyclohexene | 13 | 1.8 | 10 |
| Chlorobenzene | Toluene | 4.0 | | |

Table III gives the separatory capacities obtained in the same manner of a 95% n-butyl acrylate/5% divinylbenzene resin for a group of four azeotropic mixtures, the first three of which are of the minimum boiling point variety and the last of which is of the maximum boiling point variety, the solvent in the first column of the table being the one preferentially absorbed by the resin.

TABLE III

| Mixture | | | | Separatory Capacity |
|---|---|---|---|---|
| | Vol. Percent | | Vol. Percent | |
| Chlorobenzene | 14.1 | Allyl alcohol | 85.9 | 16 |
| Benzene | 51 | Acrylonitrile | 49 | 10 |
| Allyl alcohol | 75.3 | Water | 24.7 | 22 |
| Chloroform | 65.7 | Acetone | 34.3 | 32 |

The absorption process may be carried out in a simple batch operation or by a continuous procedure. In the batch operation, the copolymer absorbent may be supported in a suitable absorption cell or vessel which in most practical operations normally takes the form of a tower or column suitably packed with the copolymer particles which may be of any suitable size or mesh such as that which will pass through a 30-mesh screen but will largely be trapped by a 100-mesh screen (Tyler Standard). The liquid mixture is passed through the mass of copolymer at a suitable rate, such as from top to bottom, or vice versa so that one of the components is absorbed or imbibed in the resin. Alternatively, the copolymer particles may pass in countercurrent relation to the liquid. For example, the particles may be continuously fed to the top of a column or tower into the bottom of which the liquid is fed continuously, the particles being removed from the bottom for subsequent treatment to remove or separate the liquid absorbed in any manner hereinbelow indicated, and the liquid issuing from the top being additionally treated, if desired, as indicated hereinafter.

If the mixture is a two-component mixture, say composed of liquids A and B, of which A is preferentially absorbed, B will issue from the resin until the limit of the absorption capacity for A is reached after which the original mixture A and B will issue. B is, of course, collected separately. In this way, some pure B is obtained. When the limit of the absorption capacity of the resin has been reached, excess liquid is removed by draining, centrifuging or the like, and then the absorbed liquid is removed, such as by heating to distill, treatment with steam to effect steam distillation thereof, by extraction (leaching) or desorption with another solvent which is easily separable by such means as fractional distillation, crystallization of one or the other liquid, or by any other procedure. After separation of enriched A from the resin, the resin is ready for re-use. This batch-wise method therefore effects the separation of pure B and enrichment of A from the original A-B mixture.

A complete separation of the components from a mixture A-B may be effected by the use of a desorbent C in a continuous process. In a continuous procedure, which may also be called a cyclic process, the mass of resin supported suitably as in a tower or column may be fed alternately with the liquid mixture (say A and B again for simple illustration) and with a desorbent. The desorbent C is a solvent which is completely miscible with A and B at the operating temperature, which as stated before may be anywhere above the freezing point, and below the boiling point, of part or all of the liquids involved, and is preferably between 15 and 35° C. The desorbent used can be a single substance or it may be a liquid mixture of several compounds or it may be two or more liquids introduced in succession and it generally has a swelling power for the resin that is of the same order as that of one of the components of the liquid mixture to be separated, such as either A or B of the simple system mentioned above. Unless a mixture of C with one or the other or each of the components e.g., A and B is desired, the desorbent C should be readily separable from one or each of the components A and B as by fractional distillation, crystallization, or extraction so that one or both of A and B can be obtained in substantially pure form. In the continuous system, it is generally desirable at the start of the operation to fill the resin bed or column with the desorbent, then to introduce the mixture of liquids, e.g. A and B to be separated, and then to introduce alternately the desorbent and the mixture. The amount of liquid mixture A-B that can be introduced or passed through a given weight of resin depends on the concentration of the preferentially absorbed component such as liquid A. The higher the concentration, the higher is the capacity. This capacity can be determined as indicated above.

The proportion of the desorbent C to be used depends on various factors including particularly the concentration of the component A or B that is preferentially absorbed on the resin and the limit of the absorption capacity of the resin for such component. The amount of desorbent can be readily determined in any particular system by simply supplying either an excess or deficiency of desorbent C after the introduction of an amount of mixture (A and B) which is within the separatory capacity of the resin and then introducing the second portion of mixture as would be done in normal operation. If an excess of desorbent is supplied, the effluent from the resin will change from a mixture of B and C to pure C, then to a mixture of A and C, then to C, then to a mixture of B and C, and so on. Each fraction is collected separately and the change from a mixture to pure C and from C to a mixture can be readily followed by suitable analyses as mentioned above, such as determination of the refractive index at frequent intervals. The fraction of pure C discharged at alternate intervals can then be reduced, if desired, by introduction of smaller portions of C in the subsequent stages until the amount of pure C discharged between the discharge of mixtures is zero or negligible. On the other hand, if a deficiency of C is introduced, there will be no effluent portions made of pure C but the discharge of B and C will be followed by a mixture of A, B, and C before A and C is discharged.

In this case, the amount of desorbent C is increased in subsequent stages until the mixture A, B, and C disappears or its place is taken by a negligible amount of C. It is generally the case that the amount of desorbent added at each alternate stage is somewhat greater than the amount of mixture A and B added at each intervening stage. This, however, may have exceptions depending on the particular system. Like all other column operations, maximum efficiency is obtained at infinitesmal rates of pass. But for practical purposes, the speed of operation is increased. In the present case, rates at about 0.007–0.01 ml./ml. of bed/min. are generally used. Generally 55 to 80% efficiency of operation is attained.

The separate portions of effluent collected, some of which contain, for example, A and C and others of which contain B and C in the example cited are then treated to separate component A or B, if either of these components are desired separate from the desorbent C. Such separation may be effected by any of the procedures mentioned in connection with the separation of the desired liquid component from the leaching effluent in the batch process, such as fractional distillation, freezing, crystallization, extraction, etc.

While in some respects, the process of the present invention resembles an adsorption process, it is probably most analogous to solvent extraction processes and could be termed a "solid-solvent" extraction process since a solid instead of a liquid serves as the extractant. Besides the single contact or batch extraction and the continuous systems just described, the liquid under treatment may be passed in succession through a plurality of fixed beds of the copolymer absorbent or through a plurality of beds thereof which are moved continuously or stepwise in countercurrent relation to the liquid. If desired, in any of these procedures, the liquid under treatment may be converted into vapor by distillation before contacting the copolymer absorbent on which it is condensed to a distinct liquid phase coating the resin. Continuous extractive distillation procedures are particularly advantageous.

The following examples, in which parts and percentages are by weight unless otherwise noted, are illustrative of the present invention:

*Example 1*

(a) A column (bed volume being 46 ml. and ratio of height to diameter being 50:1) of 14.5 grams of a granular cross-linked copolymer of a mixture of 95% of 2-ethylhexyl acrylate and 5% of divinylbenzene is filled with 33 ml. of isooctane (2,2,4-trimethylpentane) and a mixture of 10% by volume of toluene and 90% by volume of isooctane is introduced into the top of the colum and is passed through the column at a rate of 0.0052 ml./ml. of bed/minute. The first 38 ml. of effluent is toluene-free isooctane. The liquid is then drained from the resin and the resin is subjected to steam distillation which yielded a mixture enriched in toluene.

(b) By the procedure of part (a) hereof and not counting the original isooctane in column for packing purposes, 54 ml. of isooctane is recoverable per 100 grams of a granular copolymer of a mixture of 95% of n-butyl acrylate and 5% of divinylbenzene.

(c) In the same way, 30 ml. of isooctane is recoverable per 100 grams of a granular copolymer of a mixture of 95% of n-butyl methacrylate and 5% of divinylbenzene.

(d) In the same way, 32 ml. of isooctane is recoverable per 100 grams of a granular copolymer of a mixture of 95% of ethoxyethyl acrylate and 5% of divinylbenzene.

(e) The procedure of part (a) is repeated but at twice the rate of passage through the resin column. Similar but somewhat diminished recovery is effected.

*Example 2*

A column (6 feet high, 2 3/16" diameter) of resin absorbent is prepared by partially filling a glass tube of the dimensions given with n-pentane (desorbent) and then with 1.772 kg. of a granular copolymer of a mixture of 95% n-butyl acrylate and 5% divinylbenzene having an average size of 40 to 70 mesh. Excess pentane is drained so there is no head of pentane above the resin column or bed. The column is jacketed and maintained at a temperature of 15° C. by the passage of a cooling liquid through the jacket. Then 820 ml. of a 10% by volume toluene solution in isooctane is introduced at a rate of 31.5 ml. per bed per minute followed by 2250 ml. of n-pentane at the same rate; and the alternate introduction of 820 ml. portions of 10% toluene/isooctane (2,2,4-trimethylpentane) solution and 2250-ml. portions of n-pentane is repeated indefinitely. The effluent issuing is collected in separate fractions, alternate ones (first, third, and so on) of which contain a mixture of pentane and isooctane and intervening ones (second, fourth, and so on) of which contain a mixture of toluene and pentane. The pentane-isoctane fractions are combined and fractionally distilled, the isooctane being recovered in a yield of 98.6% and a purity of 99.7% both by weight. The pentane-toluene fractions are combined and fractionally distilled, the toluene being recovered in a yield of 96.5% and a purity of 99.4%.

*Example 3*

(a) A 50-ml. burette is filled with 18.0 grams of n-butyl acrylate-5% divinylbenzene granular copolymer and 27 ml. of isooctane. The column is held at 35° C. An excess of a 19.4 volume percent of dimethyl sebacate in isooctane is allowed to percolate through the bed at 0.006 ml./ml. of bed/min. until the mother liquor breaks through. Not counting the original isooctane in column for packing purposes, a total of 81 ml. of isooctane per 100 grams resin is obtained by this method.

(b) In like manner from a 23.4 volume percent of methyl caprate in isooctane, 5 ml. of isooctane per 100 grams of the resin is obtained.

*Example 4*

(a) The same resin bed described in Example 3 is thoroughly rinsed with excess isooctane. Excess liquid is drained off until the level of liquid meets the top of the resin bed. Two milliliters of a 25 volume percent solution of dimethyl sebacate in methyl stearate is passed through the bed at 35° C. at a rate of 0.006 ml./ml. of bed/min. After the last of the ester solution has passed through the top of the bed, 80 ml. of isooctane which functions as the desorbent is then allowed to percolate through the bed. This alternate addition of solvent mixture and desorbent is repeated indefinitely. By the change of the indices of refraction of the effluent, the following successive fractions are obtained repeatedly: 22 ml. isooctane, 16 ml. methyl stearate-isooctane mixture, 5 ml. isooctane, 27 ml. dimethyl sebacate-isooctane mixture, and 12 ml. isooctane. The respective ester-isooctane mixtures are separately fractioned in an efficient column. Pure methyl stearate and pure dimethyl sebacate, free from each other, are obtained.

(b) In like manner, a 25 volume percent of dimethyl sebacate in methyl caprate is separated into its two components free from each other by using isooctane as the desorbent.

(c) In like manner, a miscible mixture consisting of 25 volume percent of dimethyl sebacate, 45% methyl caprate and 30% methyl stearate is separated into pure dimethyl sebacate and a mixture of methyl caprate and methyl stearate (in 45:30 volume ratio) by using isooctane as the desorbent in a continuous process.

*Example 5*

(a) A 50-ml. burette is filled with 21.1 grams of methyl acrylate-7% divinylbenzene granular copolymer with the help of cyclohexane. The excess solvent is drained from the bed. Steam, followed by hot air, is used to free the resin from any imbibed solvent. Excess of a solution containing 10 volume percent of ethylene dichloride in cyclohexane is passed through the bed at 0.005 ml. per ml. of bed/min. at 17° C. until the mother liquor breaks through. The ethylene dichloride-free cyclohexane initially obtained (65 ml.) is collected separately. The bed is drained. The enriched solvent mixture held in the resin is driven off by steam and the bed dried by hot air. The process is repeated.

(b) When enough enriched ethylene dichloride (of 52% conc.) in cyclohexane is obtained by the above method, the liquor is passed through the regenerated bed in the same manner described and 10 ml. of additional pure cyclohexane is obtained before the 52% ethylene dichloride solution breaks through. The bed is drained. The solvent mixture held in the resin, further enriched, is driven off by steam and the bed regenerated by hot air.

(c) The bed in part (b) hereof is packed with toluene, the level of which meets the top of the resin bed. Eighteen milliliters of a 10 volume percent solution of ethylene dichloride in cyclohexane is passed through the bed at 15° C. at a rate of 0.0075 ml. per ml. of bed/min. After the last of the mixture has passed through the top of the bed, 85 ml. of toluene which functions as the desorbent is then allowed to percolate through the bed at the same rate. This alternate addition of solvent mixture and desorbent is repeated indefinitely. Respective fractions of ethylene dichloride and toluene, and of cyclohexane and toluene, are collected separately. Fractional distillation of all ethylene dichloride toluene fractions yield ethylene dichloride free from cyclohexane. Fractional distillation of all cyclohexane-toluene fractions yield cyclohexane free from ethylene dichloride.

*Example 6*

(a) In the same manner as that described in Example 5, part (c), 60 ml. of an azeotropic mixture consisting of 14.2 volume percent of chlorobenzene and 85.8 volume percent of allyl alcohol is separated into its two components, free from each other, by percolation through 100 grams of n-butyl acrylate-5% divinylbenzene granular copolymer and by desorption with 300 ml. of methanol.

(b) In like manner, an azeotropic mixture consisting of 51 volume percent of benzene and 49 volume percent of acrylonitrile is separated by using methylene dichloride as the desorbent.

(c) Similarly, an azeotropic mixture consisting of 65.7 volume percent of chloroform and 34.3 volume percent of acetone is separated by using toluene as the desorbent.

*Example 7*

In the same manner as that described in Example 6, part (a), a homogeneous solution consisting of 12 volume percent of nitrobenzene and 88 volume percent of isooctane is separated into its two components by using benzene as the desorbent.

It is to be understood that changes and variations may be made without departing from the spirit and scope of the invention as defined in the appended claims.

We claim:

1. A method for concentrating a component of a homogeneous mixture consisting of at least two substantially non-ionogenic liquids, at least one of which is organic, which method comprises contacting with such mixture a resin absorbent which will absorb an organic liquid in preference to water from a mixture of the two, said resin comprising a particulate addition copolymer of a mixture of about one to about thirty mole percent of at least one polyethylenically unsaturated cross-linking agent with at least one copolymerizable monoethylenically unsaturated monomer, which copolymer is insoluble in the liquid mixture and is preferentially swollen by an organic component of the mixture and thereby has a preferential absorptive capacity for that component of the mixture.

2. A method for concentrating a component of a homogeneous mixture consisting of at least two substantially non-ionogenic liquids, at least one of which is organic, which method comprises contacting with such mixture a resin absorbent which will absorb an organic liquid in preference to water from a mixture of the two, said resin comprising a particulate addition copolymer of a mixture of about one to about thirty mole percent of at least one polyethylenically unsaturated cross-linking agent with at least one copolymerizable monoethylenically unsaturated monomer, which copolymer is insoluble in the liquid mixture and is preferentially swollen by an organic component of the mixture and thereby has a preferential absorptive capacity for that component of the mixture, and subsequently removing from the copolymer, the liquid absorbed thereon.

3. A method as defined in claim 2 in which the removal of absorbed liquid from the copolymer is effected by distillation.

4. A method as defined in claim 2 in which the removal of absorbed liquid from the copolymer is effected by a desorbent.

5. A method as defined in claim 2 in which the removal of absorbed liquid from the copolymer is effected by steam distillation.

6. A method as defined in claim 2 in which the monoethylenically unsaturated molecules comprise an ester of an acid selected from the group consisting of acrylic and methacrylic acids.

7. A method as defined in claim 2 in which the monoethylenically unsaturated molecules comprise n-butyl acrylate.

8. A method as defined in claim 2 in which the monoethylenically unsaturated molecules comprise 2-ethylhexyl acrylate.

9. A method as defined in claim 2 in which the monoethylenically unsaturated molecules comprise n-butyl methacrylate.

10. A method as defined in claim 2 in which the monoethylenically unsaturated molecules comprise ethoxyethyl acrylate.

11. A method as defined in claim 2 in which the monoethylenically unsaturated molecules comprise methyl acrylate.

12. A process as defined in claim 2 in which the liquid mixture consists of hydrocarbons.

13. A process as defined in claim 2 in which the liquid mixture consists of hydrocarbons, at least one being aromatic and at least one being paraffinic.

14. A process as defined in claim 2 in which the liquid mixture comprises a mixture of toluene and isooctane.

15. A process as defined in claim 2 in which the liquid mixture comprises a mixture of ethylene dichloride and cyclohexane.

16. A process as defined in claim 2 in which the liquid mixture comprises a mixture of esters.

17. A process as defined in claim 2 in which the liquid mixture comprises a mixture of benzene and acrylonitrile.

18. A process as defined in claim 2 in which the liquid mixture comprises a mixture of chloroform and acetone.

19. A process for separating a component of a homogeneous mixture consisting of at least two substantially non-ionogenic compounds, at least one of which is organic, which comprises passing such mixture in the liquid phase in contact with a mass of a particulate addition copolymer of a mixture of about one to about thirty mole percent of at least one polyethylenically unsaturated cross-linking agent with at least one copolymerizable monoethylenically unsaturated monomer, which copolymer is insoluble in the liquid mixture and is preferentially swollen by an organic component of the mixture and thereby has a preferential absorptive capacity for that component of the mixture, and subsequently removing from the copolymer the liquid absorbed thereon by passing a liquid desorbing agent in contact with the copolymer, said desorbing agent having a lower capacity for being absorbed by the copolymer than the preferentially absorbed component of the liquid mixture, sufficient of the desorbing agent being passed through to remove from the copolymer mass substantially all of the less-absorbed portion of the liquid mixture before removing the preferentially absorbed portion.

20. A process for separating a component of a homogeneous mixture consisting of at least two substantially non-ionogenic compounds, at least one of which is organic, which comprises passing such mixture in the liquid phase in contact with a mass of a particulate addition copolymer of a mixture of about one to about thirty mole percent of at least one polyethylenically unsaturated cross-linking agent with at least one copolymerizable monoethylenically unsaturated monomer, which copolymer is insoluble in the liquid mixture and is preferentially swollen by an organic component of the mixture and thereby has a preferential absorptive capacity for that component of the mixture, and subsequently removing from the copolymer the liquid absorbed thereon by passing a liquid desorbing agent in contact with the copolymer, said desorbing agent having a lower capacity for being absorbed by the copolymer than the preferentially absorbed component of the liquid mixture, and repeating the alternate introduction of the liquid mixture first and the desorbing agent, the amounts of the liquid mixture introduced in successive stages being substantially equal to each other and the amounts of desorbing agent introduced in intervening stages being substantially equal and sufficient to provide separate effluent portions consisting of a mixture of desorbent and the preferentially absorbed component of the liquid mixture and separate effluent portions consisting of a mixture of desorbent and the remainder of the liquid mixture.

21. A process as defined in claim 20 in which the liquid mixture consists of a hydrocarbon mixture containing an aromatic component and a paraffinic component and the desorbent is a paraffinic hydrocarbon.

22. A process as defined in claim 20 in which the liquid mixture is a mixture of toluene and isooctane and the desorbent is n-pentane.

23. A process as defined in claim 20 in which the operation is effected at a temperature of 15° to 35° C.

24. A method of concentrating a component of a homogeneous mixture consisting of at least two substantially non-inorganic liquids, at least one of which is organic, which method comprises contacting with such mixture a resin absorbent which will absorb an organic liquid in preference to water from a mixture of the two, said resin comprising a particulate cross-linked addition copolymer of at least one monoethylenically unsaturated compound, said copolymer being insoluble in the liquid mixture and being preferentially swollen by a particular component of the liquid mixture and thereby has a preferential absorptive capacity for that particular component of the mixture.

25. A process for separating a hydrocarbon having a relatively large carbon-to-hydrogen ratio from a hydrocarbon mixture containing the same and a more saturated hydrocarbon having a relatively smaller carbon-to-hydrogen ratio which comprises contacting said mixture with and selectively absorbing the first mentioned hydrocarbon in a resin insoluble in said mixture, said resin formed by cross-polymerizing from 90 to 99 percent by weight of an aromatic hydrocarbon having a single nuclear vinyl substituent with from one to thirty mole percent of a monomer copolymerizable therewith characterized as an aromatic hydrocarbon having more than one nuclear vinyl substituent and thereafter separating an effluent comprising said hydrocarbon of relatively smaller carbon-to-hydrogen ratio from a combination of said resin with said hydrocarbon of relatively large carbon-to-hydrogen ratio.

References Cited in the file of this patent

UNITED STATES PATENTS

| 2,306,610 | Barrer | Dec. 29, 1942 |
| 2,487,804 | Hermanson | Nov. 15, 1949 |
| 2,632,012 | Boldingh | Mar. 17, 1953 |

FOREIGN PATENTS

| 731,335 | Great Britain | June 8, 1955 |

OTHER REFERENCES

"Ion Exclusion," I & E Chem., vol. 45, No. 1, p. 228 (article by Wheaton and Bauman), January 1953.

"Concentration Effects of Recycling in Ion Exclusion," I.E. Chem., vol. 46, No. 9 (article by Simpson and Bauman, p. 1958), September 1954.